United States Patent
Kasahara et al.

(10) Patent No.: US 7,406,301 B2
(45) Date of Patent: Jul. 29, 2008

(54) MODULATION-DEMODULATION APPARATUS AND WIRELESS COMMUNICATION APPARATUS

(75) Inventors: Masaaki Kasahara, Saitama (JP); Shinji Miya, Kanagawa (JP); Kuniyuki Nakayama, Kanagawa (JP)

(73) Assignees: Sony Ericsson Mobil Communicatons Japan, Inc., Tokyo (JP); Asahi Kasei EMD Corporation, Tokyo (JP)

( * ) Notice: Subject to any disclaimer, the term of this patent is extended or adjusted under 35 U.S.C. 154(b) by 484 days.

(21) Appl. No.: 10/426,234

(22) Filed: Apr. 30, 2003

(65) Prior Publication Data
US 2004/0033785 A1 Feb. 19, 2004

(30) Foreign Application Priority Data
May 1, 2002 (JP) .............................. 2002-129597

(51) Int. Cl.
*H04B 1/16* (2006.01)
(52) U.S. Cl. ..................... 455/209; 455/146; 455/196.1; 455/147
(58) Field of Classification Search ............. 455/21–23, 455/42–44, 74, 76, 85, 86, 551, 102, 106–108, 455/110, 112, 113, 126, 131, 141, 146, 147, 455/151.3, 183.1, 205, 190.1, 208, 196.1, 455/209, 255, 258, 259, 260, 7, 476; 379/219
See application file for complete search history.

(56) References Cited

U.S. PATENT DOCUMENTS

| | | | | |
|---|---|---|---|---|
| 5,966,666 | A * | 10/1999 | Yamaguchi et al. | 455/552.1 |
| 6,289,204 | B1 * | 9/2001 | Estes et al. | 455/78 |
| 6,421,530 | B1 * | 7/2002 | Adachi et al. | 455/86 |
| 2001/0014596 | A1 * | 8/2001 | Takaki et al. | 455/324 |
| 2001/0051507 | A1 * | 12/2001 | Ichihara | 455/86 |
| 2002/0114413 | A1 * | 8/2002 | Zarubinsky et al. | 375/345 |
| 2003/0147459 | A1 * | 8/2003 | Ryter | 375/219 |

FOREIGN PATENT DOCUMENTS

EP   0 798 880   10/1997

(Continued)

OTHER PUBLICATIONS

Patent Abstracts of Japan vol. 1999, No. 08, Jun. 30, 1999 & JP 11 068863 A (Matsushita Electric Ind Co Ltd), Mar. 9, 1999.

(Continued)

*Primary Examiner*—Matthew Anderson
*Assistant Examiner*—Dominic E Rego
(74) *Attorney, Agent, or Firm*—Frommer Lawrence & Haug LLP; William S. Frommer; Thomas F. Presson

(57) ABSTRACT

A modulation-demodulation apparatus of a relatively simple arrangement is able to prevent a bad influence caused due to interference between two local oscillators and a portable wireless communication apparatus uses this modulation-demodulation apparatus. In a modulation-demodulation apparatus using a local oscillator (105) for use in direct conversion type of a receiving system and a local oscillator (104) for use with a transmitting system, a ratio (C/D) between a reception frequency and an oscillation frequency of the reception local oscillator (105) and a ratio (A/B) between a transmission frequency and an oscillation frequency of the transmission local oscillator are made different from each other.

8 Claims, 5 Drawing Sheets

FOREIGN PATENT DOCUMENTS

| | | |
|---|---|---|
| EP | 0 905 917 | 3/1999 |
| EP | 0905917 A2 * | 3/1999 |
| EP | 0798880 A3 * | 7/1999 |
| JP | 9 261106 | 10/1997 |
| JP | 2000 295303 | 10/2000 |
| JP | 2003 152558 | 5/2003 |

OTHER PUBLICATIONS

Patent Abstracts of Japan vol. 017, No. 404 (E-1405), Jul. 28, 1995 & JP 05 075495 A (Hitachi Ltd), Mar. 26, 1993.

* cited by examiner

MODULATION-DEMODULATION APPARATUS AND WIRELESS COMMUNICATION APPARATUS

BACKGROUND OF THE INVENTION

1. Field of the Invention

The present invention relates generally to a wireless communication apparatus such as a two-way radio, and particularly to a modulation-demodulation apparatus for use with a portable wireless communication apparatus such as a two-way radio.

2. Description of the Related Art

In the reception direct conversion technologies in which the receiving system of a suitable portable wireless communication apparatus such as a two-way radio uses a single local oscillator, when the transmitting system also uses only one local oscillator, it is customary that an oscillation frequency of a transmission local oscillator is selected to be twice as high as the transmission frequency (conversion coefficient A/B=1/2) and that an oscillation frequency of a reception local oscillator is selected to be twice as high as the reception frequency (conversion coefficient C/D=1/2). Specifically, in this case, the local oscillators of the transmission side and the reception side employ the same conversion coefficient ratio (frequency-dividing ratio). This direct conversion system has advantages such that its circuit system can be simplified and that its circuit scale can be made small.

When each of the transmission system and the reception system uses one local oscillator as described above, the two local oscillators have been mounted so far on separate modules or the two local oscillators have been incorporated within separate ICs (integrated circuits). Hence, there arises no problem. In recent years, in order to miniaturize device size in a portable wireless communication apparatus (two-way radio), such as a cellular phone, two local oscillators should be mounted within the same small module as close as possible or two local oscillators should be integrated within one chip. As a consequence, according to the above-described circuit system, a risk becomes remarkable, in which a fatal bad influence will be exerted upon reception sensitivity by interference between the two local oscillators.

To avoid such bad influence, there should be required some countermeasure for suppressing the occurrence of interference between substrates or the occurrence of interference in space. Accordingly, it is proposed to take a measure for covering assembly parts of the apparatus, for example, with shields or it is proposed to take a measure for locating the two local oscillators with a large physical distance therebetween. However, it is unavoidable that this measure, for example, causes a demerit from standpoints of freedom required when a substrate is designed, a design cost, a cost for shielding assemblies and mass-productivity.

Japanese laid-open patent application 2001-230695 describes an example of a wireless communication apparatus of direction conversion system in which a signal of the transmission system can be prevented from exerting a bad influence on the reception system. Basically, this direct conversion system technology essentially differs from the present invention in that it is assuming that one local oscillator is shared by the transmission system and the reception system. As a problem that arises when the transmission system and the reception system share one local oscillator, in the simultaneous transmission and reception system (e.g. CDMA (code division multiple access) system such as W-CDMA (wideband-CDMA) and cdmaOne or TDMA (time division multiple access) system such as a packet correspondence PDC (personal digital cellular)), when a signal is received at an intense electric field, there is a risk that the received signal will be leaked to the local oscillator. This leakage of the received signal deteriorates purity of signal and exerts a bad influence upon characteristics (e.g. accuracy of modulation, adjacent channel leakage electric power, spurious response, etc.) of the transmission system. Conversely, when a large signal is transmitted, there is a risk that the transmitted signal will be leaked to the local oscillator. This leakage of the transmitted signal exerts a bad influence upon characteristics (e.g. reception sensitivity, adjacent channel selectivity, spurious response, etc.) of the reception system. To avoid these shortcomings, it is necessary to take some countermeasure for decreasing leakages of the transmitted signal and the received signal into the local oscillator. For example, it is proposed that a buffer circuit may be added to the circuit arrangement of the portable wireless communication apparatus, which however, brings about a demerit from standpoints of a circuit scale, a cost and a time period necessary for awaiting incoming calls (i.e. time period necessary for making calls).

SUMMARY OF THE INVENTION

In view of the aforesaid aspect, it is an object of the present invention to provide a modulation-demodulation apparatus of a relatively simple arrangement in which a bad influence caused by interference between two local oscillators can be prevented.

Another object of the present invention is to provide a portable wireless communication apparatus (e.g. two-way radio) that makes use of such modulation-demodulation apparatus.

According to an aspect of the present invention, there is provided a modulation-demodulation apparatus which is comprised of a transmitting circuit including a modulator for modulating a transmission signal, a single transmission local oscillator for use with the transmitting circuit, a first frequency divider for converting an oscillation frequency of the transmission local oscillator to provide a transmission frequency, a receiving circuit including a demodulator for demodulating a reception signal, a single reception local oscillator for use with the receiving circuit and a second frequency divider for converting an oscillation frequency of the reception local oscillator to provide a reception frequency, wherein a frequency-dividing ratio of the first frequency divider and a frequency-dividing ratio of the second frequency divider are made different from each other and local oscillation frequencies of the transmission local oscillator and the reception local oscillator are determined based upon the transmission frequency, the reception frequency and the respective frequency-dividing ratios.

In this modulation-demodulation apparatus, the first frequency divider converts the oscillation frequency of the transmission local oscillator to provide the transmission frequency. Then, the second frequency divider converts the oscillation frequency of the reception local oscillator to provide the reception frequency. The frequency-dividing ratio of the first frequency divider and that of the second frequency divider are made different from each other. In accordance therewith, the oscillation frequency of the transmission local oscillator is determined based upon the transmission frequency and the first frequency-dividing ratio and also the oscillation frequency of the reception local oscillator is determined based upon the reception frequency and the second frequency-dividing ratio.

According to the modulation-demodulation apparatus of the present invention, since the frequency-dividing ratio of the first frequency divider and that of the second frequency divider are made different from each other, it is possible to avoid reception quality from being deteriorated even when interference occurs between the two local oscillation signals.

The frequency-dividing ratio of the second frequency divider should preferably be set to be larger than that of the first frequency divider by which the oscillation frequency of the reception local oscillator can be set to be lower.

The transmitting circuit may further include a frequency converter for frequency-converting an output of the modulator and the first frequency divider may consist of a plurality of frequency dividers for frequency-dividing the oscillation frequency of the transmission local oscillator to provide two frequencies that are to be supplied to the modulator and the frequency converter.

Further, according to another aspect of the present invention, there is provided a wireless communication apparatus which makes use of the above-mentioned modulation-demodulation apparatus. This wireless communication apparatus is comprised of a transmitting circuit including a modulator for modulating a transmission signal, a single transmission local oscillator for use with the transmitting circuit, a first frequency divider for converting an oscillation frequency of the transmission local oscillator to provide a transmission frequency, a receiving circuit including a demodulator for demodulating a reception signal, a single reception local oscillator for use with the receiving circuit, a second frequency divider for converting an oscillation frequency of the reception local oscillator to provide a reception frequency, a user interface device including a display unit for displaying information to users and an input unit for inputting user's instructions and a voice input and output device for inputting a voice signal as transmitted voices and outputting a received voice signal as voices, wherein a frequency-dividing ratio of the first frequency divider and a frequency-dividing ratio of the second frequency divider are made different from each other and local oscillation frequencies of the transmission local oscillator and the reception local oscillator are determined based upon the transmission frequency, the reception frequency and the respective frequency-dividing ratios.

DESCRIPTION OF THE PREFERRED EMBODIMENT

A modulation-demodulation apparatus and a portable wireless communication apparatus according to an embodiment of the present invention will hereinafter be described with reference to the drawings.

Figure 1:
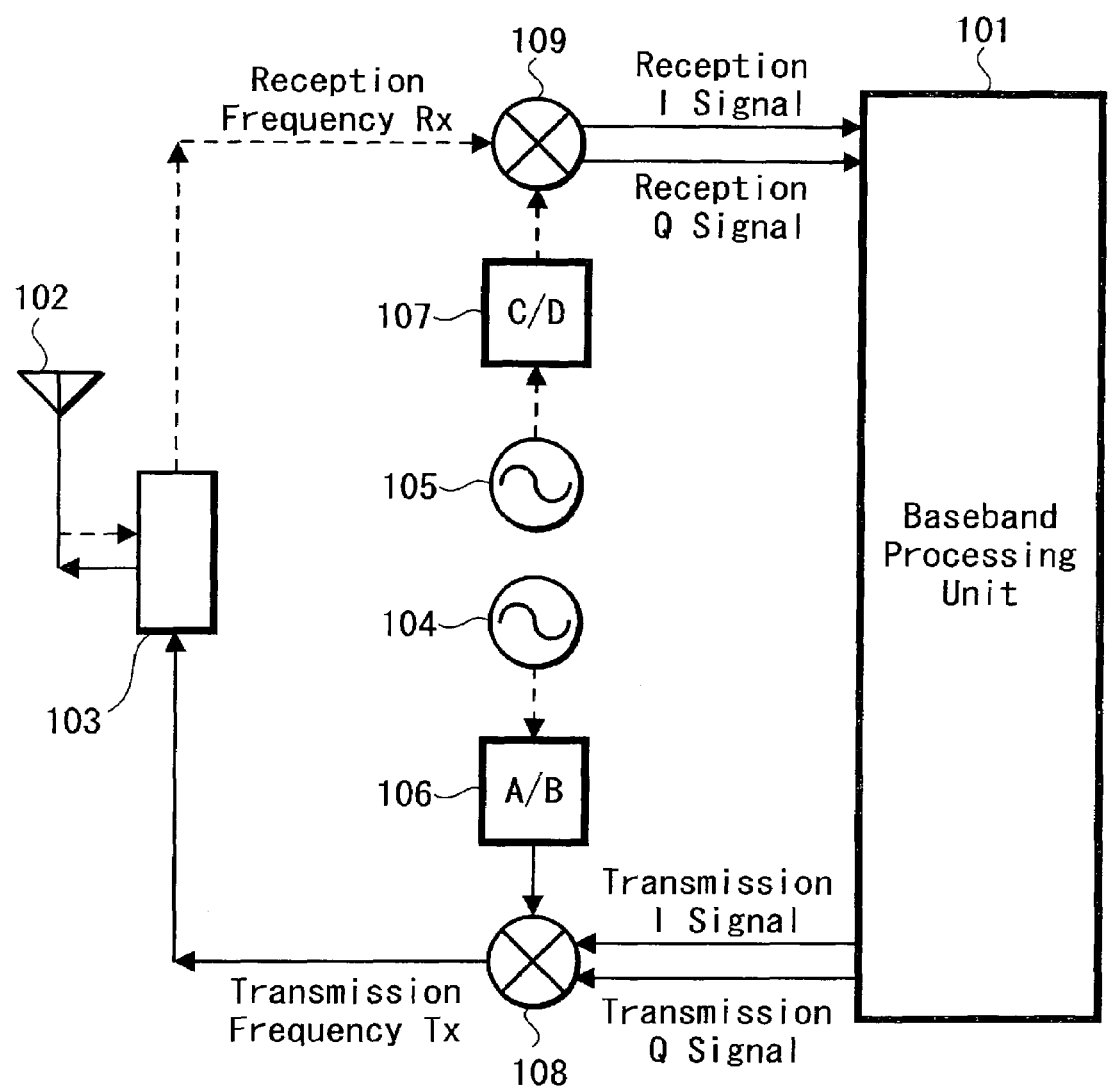
FIG. 1 is a schematic block diagram showing a modulation-demodulation apparatus together with its accompanying elements and parts.

FIG. 1 of the accompanying drawings shows a block diagram of a modulation-demodulation apparatus and its accompanying elements and parts. As shown in FIG. 1, a modulation-demodulation apparatus comprises a transmission local oscillator 104, a reception local oscillator 105, a transmission frequency converting circuit (frequency divider) 106, a reception frequency converting circuit (frequency divider) 107, an orthogonal modulator 108 and an orthogonal demodulator 109. The orthogonal modulator 108 and the orthogonal demodulator 109 are connected to a baseband processing unit 101 and an antenna sharing unit 103, respectively. The antenna sharing unit 103 is connected to an antenna 102.

Transmitting operations of this modulation-demodulation apparatus will be described below. As shown in FIG. 1, this modulation-demodulation apparatus inputs transmission IQ signals outputted from the baseband processing unit 101 and a transmission signal having a frequency which is the same frequency as a transmission frequency (Tx), which results from multiplying a local oscillation signal generated from the transmission local oscillator 104 A/B times by the transmission frequency converting circuit 106, to the orthogonal modulator 108 thereby to generate a transmission signal Tx that had been orthogonally modulated by the orthogonal modulator 108. This transmission signal Tx is supplied through the antenna sharing unit 103 to the antenna 102 from which it is transmitted to the outside to make wireless communication. It is to be noted that when the transmission IQ signals are converted into the transmission signal Tx, there is used only one transmission local oscillator 104 and that there is used the orthogonal modulator 108 that can directly convert the transmission IQ signals into the transmission signal Tx (direct conversion system).

Receiving operations of this modulation-demodulation apparatus will be described below. As shown in FIG. 1, the modulation-demodulation apparatus inputs the reception signal, which has been received by the antenna sharing unit 103 through the antenna 102, and a signal having the same frequency as the reception signal (Rx), which results from multiplying the frequency C/D times by the reception frequency converting circuit 107, to the orthogonal demodulator 109 to allow this orthogonal demodulator 109 to generate reception IQ signals. The reception IQ signals are inputted to the baseband processing unit 101 to thereby make wireless communication. It is to be noted that when the reception signal is converted into the reception IQ signals, there is used only one local oscillator 104 and that there is used the orthogonal demodulator 109 that can directly convert the reception signal into the reception IQ signals (direct conversion system).

In this embodiment, the frequency-dividing ratio of A/B of the transmission frequency converting circuit 106 and the frequency-dividing ratio of C/D of the reception frequency converting circuit 107 are made different from each other. Frequency-dividing ratios of 1/2, 3/2, 1/4, 3/4, 5/4, 1/8, 3/8 and so forth are available as frequency-dividing ratios that can be used in this embodiment (however, the present invention is not limited to the above-mentioned available frequency-dividing ratios and "frequency-division" in this specification may contain frequency-conversion that cannot only decrease frequencies but also can increase frequencies). In this embodiment, the frequency-dividing ratio 3/4 is available as the frequency-dividing ratio A/B and the frequency-dividing ratio 3/2 is available as the frequency-dividing ratio C/D. When the transmission frequency Tx, for example, is 1.92 GHz, if the frequency-dividing ratio A/B is set to 3/4, then since an oscillation frequency Ft of the transmission local oscillator 104 can be expressed as:

$$Ft \times 3/4 = 1.92 \text{ GHz}$$

Thus, we have:

$$Ft \approx 2.6 \text{ GHz}$$

When the reception frequency Rx, for example, is 2.11 GHz, if the frequency-dividing ratio C/D is set to 3/2, then since an oscillation frequency Fr of the reception local oscillator 105 can be expressed as:

$$Fr \times 3/2 = 2.11 \text{ GHz}$$

Thus, we have:

$$Fr \approx 1.4 \text{ GHz}$$

In this manner, according to this embodiment, the frequency-dividing ratio C/D of the reception frequency converting circuit 107 is set to be larger than the frequency-dividing ratio A/B of the transmission frequency converting circuit 106. In general, power consumption of the circuit increases as the oscillation frequency of the local oscillator increases. When this modulation-demodulation apparatus is applied to a portable wireless communication apparatus such as a cellular phone which will be described later on, from a standpoint of needs for awaiting incoming calls continuously for a long time period, it is strongly desired that the power consumption on the receiving circuit should be decreased as compared with the transmitting circuit. Therefore, a relationship between the above two frequency-dividing ratios is set in such a manner that the oscillation frequency of the reception local oscillator may be lowered.

Figure 2:
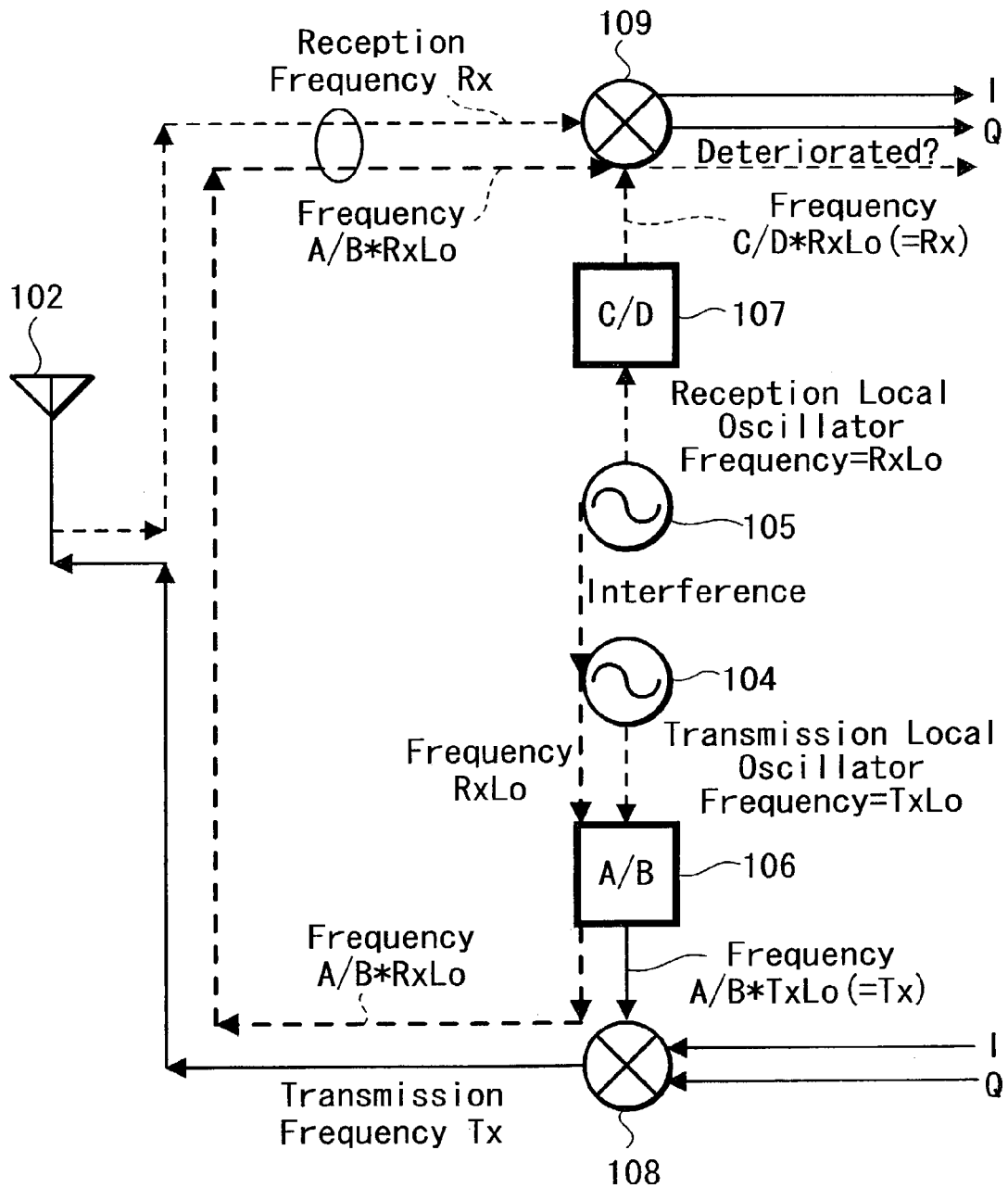
FIG. 2 is a schematic block diagram to which reference will be made in explaining the case in which an oscillation output from a reception local oscillator interferes with an oscillation output from a transmission local oscillator.
Figure 3:
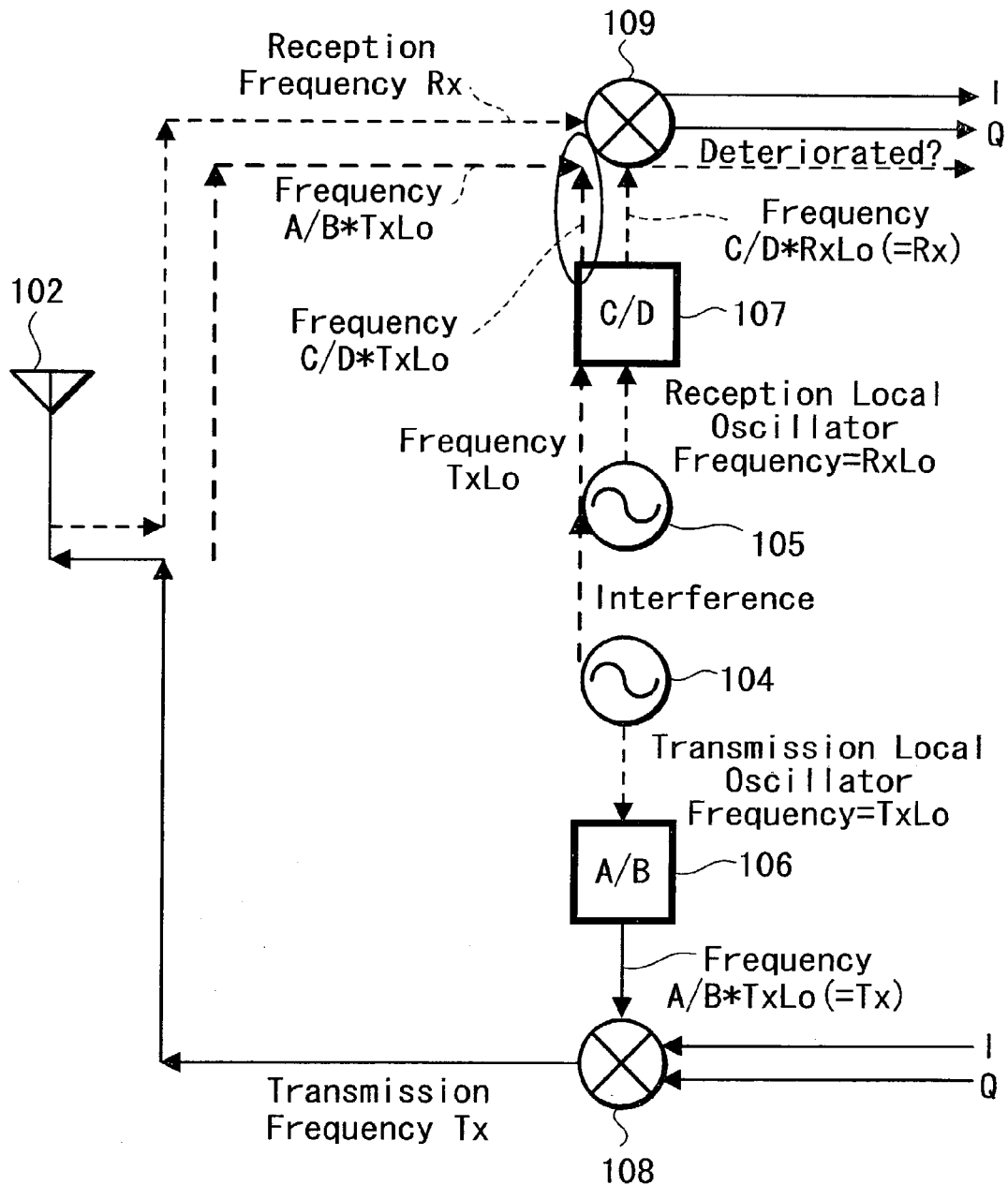
FIG. 3 is a schematic block diagram to which reference will be made in explaining the case in which an oscillation output from a transmission local oscillator interferes with an oscillation output from a reception local oscillator.

Next, importance for making the frequency-dividing ratio C/D of the reception frequency converting circuit 107 become different from the frequency-dividing ratio A/B of the transmission frequency converting circuit 106 will be described below with reference to FIGS. 2 and 3. In FIGS. 2 and 3, elements and parts identical to those of FIG. 1 are denoted by identical reference numerals.

FIG. 2 is a schematic block diagram to which reference will be made in explaining the case in which the oscillation output of the reception local oscillator 105 interferes with the oscillation output of the transmission local oscillator 104. In this embodiment, RxLo assumes the oscillation frequency of the reception local oscillator 105 and TxLo assumes the oscillation frequency of the transmission local oscillator 104. Then, when the oscillation signal of the reception local oscillator 105 is leaked to the oscillation signal of the transmission local oscillator 104 and passed through the transmission frequency converting circuit 106, a signal having a frequency A/B*RxLo is mixed into the transmission signal and a part of this signal is leaked to the receiving side and thereby inputted to the orthogonal demodulator 109. On the other hand, the oscillation frequency RxLo of the reception local oscillator 105 is converted into a frequency C/D*TxLo, which is equal to the reception frequency Rx, by actions of the reception local oscillator 105. If the two frequency-dividing ratios are equal to each other (A/B=C/D), then a signal having a frequency A/B*RxLo, which is the reception local oscillation frequency RxLo leaked from the transmitting circuit and received, is demodulated by the orthogonal demodulator 109 and then outputted. Therefore, when the two frequency-dividing ratios are equal to each other (A/B=C/D), the reception characteristic is deteriorated in the aforementioned simultaneous transmission and reception system. Conversely, if the two frequency-dividing ratios are different from each other (A/B≠C/D), then the signal having the frequency A/B*RxLo is not demodulated by the orthogonal demodulator 109 and thereby is not outputted. Specifically, since proper frequency-dividing ratios of the transmission and reception local oscillation signals are adopted such that an undesired signal corresponding to the receiving frequency band may not be generated in the frequency component of the transmission signal leaked into the receiving signal even when the reception local oscillation signal is leaked into the transmission local oscillation signal, it is possible to prevent reception quality from being deteriorated.

FIG. 3 is a schematic block diagram to which reference will be made in explaining the case in which the oscillation output from the transmission local oscillator 104 interferes with the local oscillation output of the reception local oscillator 105. As shown in FIG. 3, when the oscillation signal from the transmission local oscillator 104 is leaked into the oscillation signal of the reception local oscillator 105 and passed through the reception local oscillator 105, a signal having a frequency C/D*TxLo is mixed into the frequency-divided output signal. When on the other hand the transmission signal having the frequency Tx (=A/B*RxLo) is leaked to the receiving side, if the two frequency-dividing ratios are equal to each other (A/B=C/D), then in the orthogonal demodulator 109, the frequency C/D*TxLo mixed into the output of the reception local oscillator 104 and the transmission frequency Tx (=A/B*RxLo) are caused to interfere with each other so that the transmission signal is mixed into the reception signal thus demodulated. However, according to the present invention, since proper frequency-dividing ratios of the transmission and reception local oscillation signals are adopted such that an undesired signal corresponding to the transmitting frequency band may not be generated in the frequency component of the reception signal leaked into the receiving signal even when the reception local oscillation signal is leaked into the transmission local oscillation signal, it is possible to prevent reception quality from being deteriorated.

In this manner, according to this embodiment, since the two frequency-dividing ratios are different from each other (A/B≠C/D), even when the local oscillation signals are caused to interfere with each other as described above, it is possible to prevent reception quality from being deteriorated.

Figure 4:
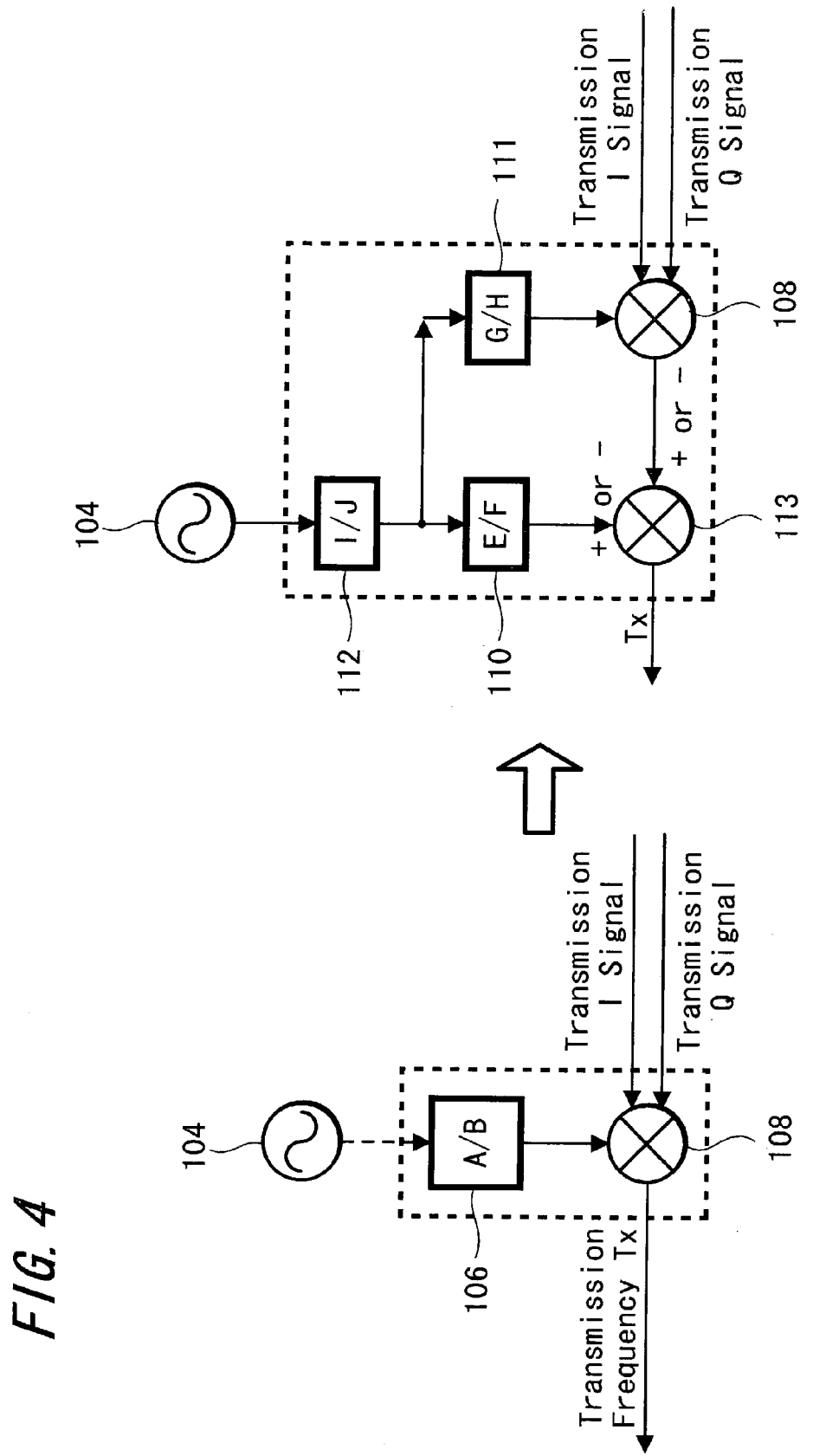
FIG. 4 is a schematic block diagram showing an example of an arrangement of a transmitting circuit obtained when the transmitting circuit is changed from the direct conversion system to the single conversion system according to an embodiment of the present invention.

FIG. 4 is a schematic block diagram showing an example of an arrangement of a transmitting circuit obtained when the transmitting circuit is changed from the direct conversion system to the single conversion system. In FIG. 4, elements and parts identical to those of FIGS. 1, 2 and 3 are denoted by the identical reference numerals. According to the single conversion system, the transmission IQ signals are not directly converted into the transmission signal having the transmission frequency Tx by the orthogonal modulator 108. In other words, after the transmission IQ signals had been converted into a signal having an intermediate frequency temporarily, the intermediate frequency is again converted into the transmission frequency Tx by the frequency converter 113. Also in this embodiment, the single transmission local oscillator 104 is shared by the orthogonal modulator 108 and the frequency converter 113 when the modulation-demodulation apparatus is in use. To be more concrete, first, the oscillation signal of the transmission local oscillator 104 is inputted to a transmission frequency converting circuit 112 having a frequency-dividing ratio of I/J, in which the frequency of the oscillation signal is converted I/J times. Then, the signal having this frequency is supplied through a transmission frequency converting circuit 110 having a frequency-dividing ratio of E/F to the frequency converter 113. On the other hand, the same output from the transmission frequency converting circuit 112 is supplied through a transmission frequency converting circuit 117 having a frequency-dividing ratio of G/H to the orthogonal modulator 108.

The signal inputted to the orthogonal modulator 108 becomes equal to a signal obtained when the frequency of the local oscillation signal from the transmission local oscillator 104 is converted (I/J*G/H) times. On the other hand, the signal inputted to the frequency converter 113 becomes equal to a signal which results from converting the frequency of the local oscillation signal from the transmission local oscillator 104 (I/J*E/F) times. The frequency converter 113 is able to calculate a sum or difference between the two inputted signals. Specifically, if I/F, E/F and G/H are determined so as to establish any one of the following equations (1), (2) and (3), then the transmission signal generating processes of the transmitting circuits on the right and left sides of FIG. 4 become equivalent to each other.

$$A/B = |(I/J*E/F) + (I/J*G/H)| \quad (1)$$

$$A/B = |(I/J*E/F) - (I/J*G/H)| \quad (2)$$

$$A/B = |-(I/J*E/F) + (I/J*G/H)| \quad (3)$$

As combinations of the frequency-dividing ratios of I/J, G/H, E/F corresponding to the frequency-dividing ratio of A/B=3/4,

I/J=1/2
G/H=1/2
E/F=1 are available, for example. In this case, the above-described equation (1) is established.

Although this system is what might be called the single conversion system, the assumption of the present invention in which only one transmission local oscillator should be used is not broken. Since the receiving system assumes the direct conversion system inherently, the equivalent conversion shown in FIG. 4 is not assumed.

Since the arrangement of the orthogonal modulator is generally complex as compared with that of the frequency converter, by combining the two orthogonal modulators stepwise as shown in the right-hand side of FIG. 4, it becomes possible to produce the orthogonal modulator 108 that can operate at a lower frequency. This is advantageous from the standpoint of reducing a consumed current. Further, since a chance at which a filter for eliminating undesired frequency components is inserted into the circuit is given by two steps of the succeeding stage of the orthogonal modulator 108 and the succeeding stage of the frequency converter 113, there is an advantage that more suitable filtering can be carried out.

Figure 5:
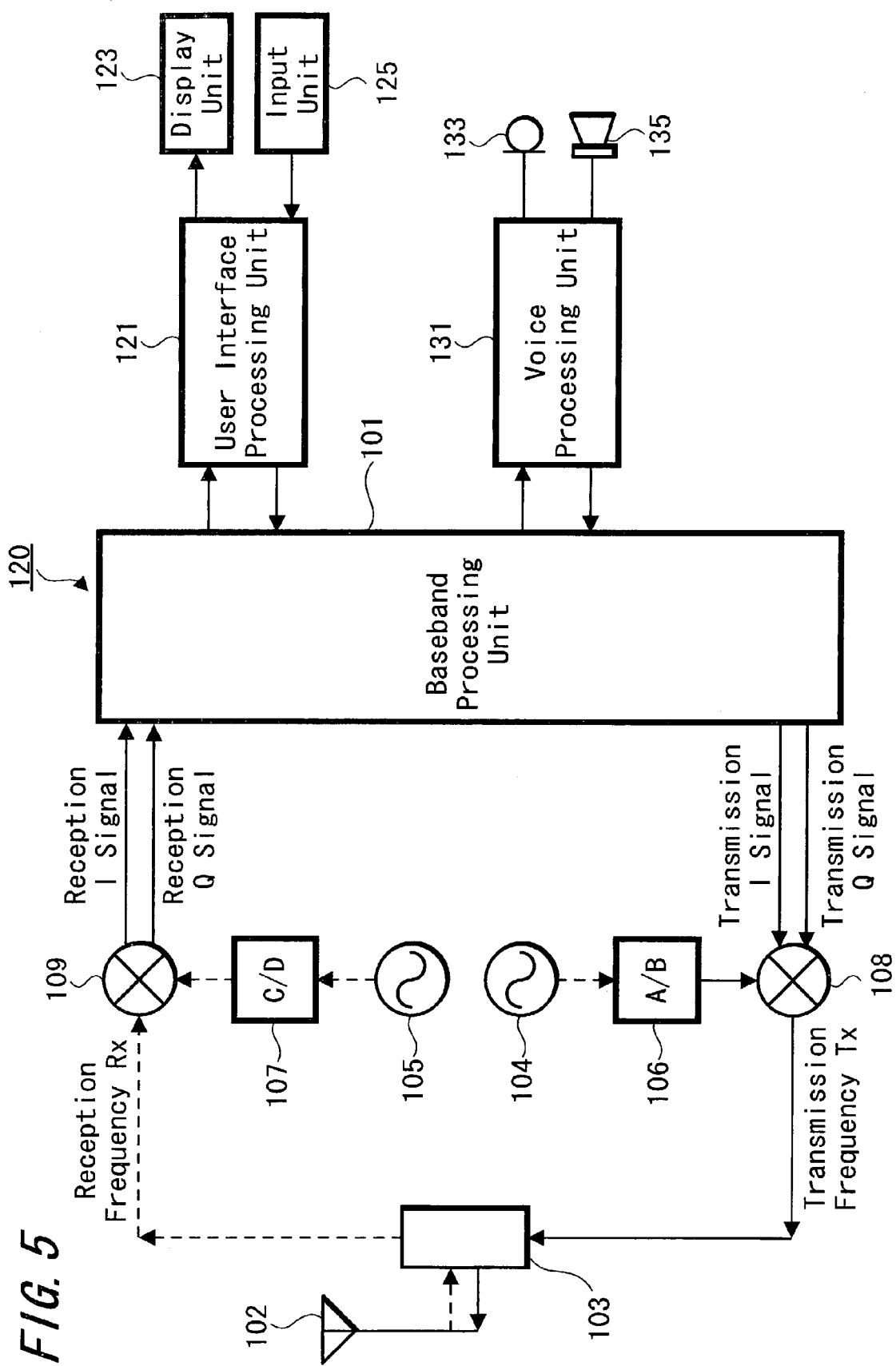
FIG. 5 is a schematic block diagram showing an arrangement of a portable wireless communication apparatus that is applied to a two-way radio like a cellular phone using the modulation-demodulation apparatus shown in FIG. 1.

FIG. 5 is a schematic block diagram showing an arrangement of an apparatus obtained when the present invention is applied to a portable wireless communication apparatus 120 such as a cellular phone using the modulation-demodulation apparatus shown in FIG. 1. In FIG. 5, elements and parts identical to those of FIGS. 2 to 4 are denoted by the identical reference numerals. As shown in FIG. 5, the baseband processing unit 101 is connected through a user interface processing unit 121 to a display unit 123 (e.g. liquid-crystal display device, etc.) for displaying information to users and an input unit 125 (e.g. key input device, etc.) for inputting user's instruction to the apparatus. These elements 121, 123, 125 consist of a user interface means according to the present invention. The baseband processing unit 101 is connected through a voice processing unit 131 to a microphone (mike) 133 and a speaker 135 to thereby support voice communication. These elements 131, 133, 135 consist of a voice input and output means according to the present invention. Although not shown, other function units for effecting data communication and so forth may be added to the arrangement of this apparatus.

While the embodiment of the present invention has been described so far, it is needless to say that the present invention is not limited thereto and can be variously modified and changed. For example, the above-described specific numerical values of the frequency-dividing ratios and the frequencies are indicated as mere examples and the present invention is not limited thereto and numerical values of frequency-dividing ratios and frequencies in the present invention can of course be changed freely.

According to the present invention, even when the local oscillation signal is leaked from one to the other between the single transmission local oscillator and the single reception local oscillator, it is possible to prevent reception quality such as reception sensitivity by using the conversion coefficient ratio between the transmission and reception oscillation signals. Thus, since restrictions imposed upon the apparatus when the two local oscillators are disposed in the apparatus can be reduced, this is advantageous to make the modulation-demodulation apparatus become compact in size, which can therefore contribute to making the portable wireless communication apparatus become compact in size.

Furthermore, since the modulation-demodulation apparatus is relatively simple in arrangement and freedom in designing the modulation-demodulation apparatus can be increased, the modulation-demodulation apparatus can be made inexpensive and costs for designing the apparatus can be decreased.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A modulation-demodulation apparatus comprising:
   a transmitting circuit including a modulator for modulating a transmission signal;
   a transmission local oscillator for use with said transmitting circuit;
   a first frequency divider; connected to the transmission local oscillator and to the modulator, for converting an oscillation frequency of said transmission local oscillator to provide a transmission frequency to the modulator;
   a receiving circuit including a demodulator for demodulating a reception signal;
   a reception local oscillator for use with said receiving circuit; and
   a second frequency divider, connected to the reception local oscillator and to the demodulator, for converting an oscillation frequency of said reception local oscillator to provide a reception frequency to the demodulator,
   wherein a frequency-dividing ratio of said first frequency divider and a frequency-dividing ratio of said second frequency divider are made different from each other, and
   wherein local oscillation frequencies of said transmission local oscillator and said reception local oscillator are determined based upon said transmission frequency, said reception frequency and said respective frequency-dividing ratios, wherein a signal corresponding to the transmitting frequency band is not generated in the frequency component of the reception signal leaked into the receiving signal when the reception local oscillation signal is leaked into the transmission local oscillation signal, and wherein said receiving circuit is a direct conversion type and said transmitting circuit is a single conversion type.

2. A modulation-demodulation apparatus according to claim 1, wherein said frequency-dividing ratio of said second frequency divider is set to be larger than that of said first frequency divider.

3. A modulation-demodulation apparatus according to claim 1, wherein said transmitting circuit and said receiving circuit both are of direct conversion system.

4. A modulation-demodulation apparatus according to claim 1, wherein said transmitting circuit further includes a frequency converter for frequency-converting an output of said modulator and said first frequency divider consists of a plurality of frequency dividers for frequency-dividing the oscillation frequency of said transmission local oscillator to provide two frequencies that are to be supplied to said modulator and said frequency converter.

5. A wireless communication apparatus comprising:

a transmitting circuit including a modulator for modulating a transmission signal;

a transmission local oscillator for use with said transmitting circuit;

a first frequency divider, connected to the transmission local oscillator and to the modulator, for converting an oscillation frequency of said transmission local oscillator to provide a transmission frequency to the modulator;

a receiving circuit including a demodulator for demodulating a reception signal;

a reception local oscillator for use with said receiving circuit;

a second frequency divider, connected to the reception local oscillator and to the demodulator, for converting an oscillation frequency of said reception local oscillator to provide a reception frequency to the demodulator; and voice input and output means for inputting a voice signal as transmitted voices and outputting a received voice signal as voices, wherein a frequency-dividing ratio of said first frequency divider and a frequency-dividing ratio of said second frequency divider are made different from each other, and wherein local oscillation frequencies of said transmission local oscillator and said reception local oscillator are determined based upon said transmission frequency, said reception frequency and said respective frequency-dividing ratios, wherein a signal corresponding to the transmitting frequency band is not generated in the frequency component of the reception signal leaked into the receiving signal when the reception local oscillation signal is leaked into the transmission local oscillation signal, wherein said receiving circuit is a direct conversion type and said transmitting circuit is a single conversion type.

6. A wireless communication apparatus according to claim 5, wherein said frequency-dividing ratio of said second frequency divider is set to be larger than that of said first frequency divider.

7. A wireless communication apparatus according to claim 5, wherein said transmitting circuit and said receiving circuit both are of direct conversion system.

8. A wireless communication apparatus according to claim 5, wherein said transmitting circuit further includes a frequency converter for frequency-converting an output of said modulator and said first frequency divider consists of a plurality of frequency dividers for frequency-dividing the oscillation frequency of said transmission local oscillator to provide two frequencies that are to be supplied to said modulator and said frequency converter.

* * * * *